United States Patent
Kitamura

(10) Patent No.: US 9,600,126 B2
(45) Date of Patent: Mar. 21, 2017

(54) LOCATION DETECTION DEVICE

(71) Applicant: Alpine Electronics, Inc., Tokyo (JP)

(72) Inventor: Kazuhiro Kitamura, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 14/463,349

(22) Filed: Aug. 19, 2014

(65) Prior Publication Data

US 2015/0062077 A1    Mar. 5, 2015

(30) Foreign Application Priority Data

Sep. 4, 2013 (JP) ................................. 2013-182677

(51) Int. Cl.
G06F 3/044 (2006.01)
G02F 1/1343 (2006.01)
G06F 3/041 (2006.01)

(52) U.S. Cl.
CPC .......... *G06F 3/044* (2013.01); *G02F 1/13439* (2013.01); *G02F 1/134336* (2013.01); *G06F 3/0416* (2013.01)

(58) Field of Classification Search
CPC ...... G06F 3/044; G06F 3/0416; G06F 3/0412; G06F 2203/04107; G06F 2203/04111; G02F 1/13338
USPC ................................................ 345/173–174
See application file for complete search history.

(56) References Cited

U.S. PATENT DOCUMENTS

| | | | |
|---|---|---|---|
| 8,587,533 B2 | 11/2013 | Nishihara et al. | |
| 2009/0176468 A1* | 7/2009 | Ciatti et al. ................ | 455/185.1 |
| 2010/0085322 A1 | 4/2010 | Mamba et al. | |
| 2010/0085325 A1 | 4/2010 | King-Smith et al. | |
| 2011/0096012 A1* | 4/2011 | Park et al. ..................... | 345/173 |
| 2011/0109577 A1* | 5/2011 | Lee et al. ...................... | 345/173 |
| 2011/0122087 A1* | 5/2011 | Jang et al. .................... | 345/174 |
| 2011/0175823 A1* | 7/2011 | Vieta .............................. | 345/173 |
| 2011/0205172 A1* | 8/2011 | Kitada .................... | G06F 3/044 |
| | | | 345/173 |
| 2011/0254805 A1* | 10/2011 | Tanimizu et al. ............ | 345/174 |

(Continued)

FOREIGN PATENT DOCUMENTS

| | | |
|---|---|---|
| EP | 0 259 970 A2 | 8/1987 |
| EP | 2 463 760 | 4/2014 |

(Continued)

OTHER PUBLICATIONS

EPO Search Report dated Mar. 17, 2015, Application No. 14167568.

(Continued)

*Primary Examiner* — Hong Zhou
(74) *Attorney, Agent, or Firm* — Brinks Gilson & Lione

(57) ABSTRACT

In a location detection device, a capacitive touch panel is disposed on a surface of a display screen of a display device. The location detection device includes a touch panel that includes a plurality of transparent electrodes arranged in mutually intersecting directions; a location detection unit that detects a touch location of an instruction body by selecting parts of the plurality of transparent electrodes and measuring a change in capacitance between the parts; and, a low impedance setting unit that, at a point in time when the location detection unit selects the parts of the transparent electrodes, puts remaining transparent electrodes into a low impedance state.

9 Claims, 5 Drawing Sheets

(56) References Cited

U.S. PATENT DOCUMENTS

| | | | |
|---|---|---|---|
| 2012/0013546 A1* | 1/2012 | Westhues et al. | 345/173 |
| 2012/0050214 A1* | 3/2012 | Kremin et al. | 345/174 |
| 2012/0139868 A1* | 6/2012 | Mamba et al. | 345/174 |
| 2012/0262411 A1* | 10/2012 | Ahn | G06F 3/0416 345/174 |
| 2014/0184313 A1* | 7/2014 | Chuang | G06F 3/044 327/517 |
| 2015/0035794 A1 | 2/2015 | Zhitomirskiy | |

FOREIGN PATENT DOCUMENTS

| | | |
|---|---|---|
| JP | 2006-302111 | 11/2006 |
| JP | 2012/068760 | 4/2012 |
| JP | 2013-172157 | 9/2013 |
| WO | WO2013/069290 | 5/2013 |
| WO | WO 2013/117877 | 8/2013 |

OTHER PUBLICATIONS

European Examination Report and Annex for Application No. 14 167 568.6, dated Sep. 29, 2015.
Office Action dispatched Dec. 13, 2016 for Japanese Patent Application 2013-182677, 5 pgs. Including English translation.

* cited by examiner

LOCATION DETECTION DEVICE

RELATED APPLICATION

The present application claims priority to Japanese Application Number 2013-182677, filed Sep. 4, 2013, the entirety of which is hereby incorporated by reference.

BACKGROUND

Field

The present disclosure relates to a location detection device including a capacitive touch panel superposed on a surface of a display device, such as a liquid crystal display (LCD).

Description of the Related Art

A display device equipped with a touch panel is known in the art. Such display device includes a touch panel provided on an observation side of a display panel. A shield layer provided between the display panel and the touch panel prevents electrical noise (see, for example, Japanese Unexamined Patent Application Publication No. 2012-68760). In this display device equipped with the touch panel, the shield layer is composed of a transparent conductive film containing a conductive polymer, so that optical properties of the display device are not degraded.

In the above display device equipped with the touch panel disclosed in Japanese Unexamined Patent Application Publication No. 2012-68760, a shield layer composed of the transparent conductive film is superposed on a surface of the display device, such that there is a problem in that transparency is reduced. Furthermore, since the shield layer has to be added in addition to the display device and the touch panel, there is a problem in that a manufacturing process or an assembly process becomes complicated and results in an increase in costs.

The present disclosure is provided in view of such problems, and has an object thereof to provide a location detection device that enables a reduction in noise generated by a display device, and also suppression of an increase in cost due to a complicated process, without reducing transparency.

SUMMARY

In order to solve the above problems, an aspect of the present disclosure provides a location detection device in which a capacitive touch panel is disposed on a surface of a display screen of a display device. The location detection device includes: a touch panel that includes a plurality of transparent electrodes arranged in mutually intersecting directions; a location detection unit that detects a touch location of an instruction body (such as a user's finger) by selecting parts of the plurality of transparent electrodes and measuring a change in capacitance between the parts; and a low impedance setting unit that, at a point in time when the location detection unit selects the parts of the transparent electrodes, puts remaining transparent electrodes into a low impedance state.

When parts of the transparent electrodes are selected for location detection, remaining transparent electrodes are put into a low impedance state, thereby enabling noise emitted from the surface of the display device to be blocked. Furthermore, when transparent electrodes are used for location detection, an additional shield layer does not have to be added, and a process for adding the shield layer does not have to be considered. Thus, reductions in transparency and increased cost due to complicated processes may be suppressed.

The plurality of transparent electrodes preferably include a plurality of first electrodes arranged along a first direction and a plurality of second electrodes arranged along a second direction intersecting the first direction. The location detection unit preferably inputs a location detection signal to part of the first electrodes and also captures a signal corresponding to the location detection signal output from part of the second electrodes. The low impedance setting unit preferably puts transparent electrodes other than transparent electrodes used for input of the location detection signal and output of the signal corresponding to the location detection signal into a low impedance state. Thus, since most electrodes other than a first electrode and a second electrode that are used for location detection are in a low impedance state, the effect of blocking noise emitted from the surface of the display device may be enhanced.

The low impedance setting unit preferably puts the transparent electrodes into a low impedance state by connecting the transparent electrodes to a fixed potential. In particular, the fixed potential is preferably a ground potential, and the low impedance setting unit preferably puts the transparent electrodes into a low impedance state by grounding the transparent electrodes. Thus, a shield layer is implemented by using the transparent electrodes, and leakage of noise emitted from the surface of the display device to the outside may be reduced.

Preferably, switches are individually connected to each of the plurality of transparent electrodes, and switching between input of the location detection signal or output of the signal corresponding to the location detection signal and connection to the fixed potential is performed via the switches. Thus, simple addition of switches enables certain transparent electrodes to be put into a low impedance state at a certain point in time.

Preferably, other transparent electrodes adjacent to parts of the transparent electrodes in which input of the location detection signal or output of the signal corresponding to the location detection signal is performed are not connected to the fixed potential, but are opened. This enables a reduction in noise emitted from the display device while maintaining the sensitivity of location detection.

The location detection device according to one aspect of the present disclosure is mounted in a vehicle together with an AM radio. Alternatively, the location detection device according to another aspect of the present disclosure is mounted in the same housing in which the AM radio is mounted. Thus, regarding the AM radio mounted in the vehicle, the effect of noise emitted from the display device may be reduced.

While a broadcast wave is being received by the AM radio, the transparent electrodes are preferably set into a low impedance state by the low impedance setting unit. Alternatively, when a reception frequency of a broadcast wave being received by the AM radio coincides with a frequency of noise emitted from the display device, the transparent electrodes are preferably set into a low impedance state by the low impedance setting unit. When a reception frequency of a broadcast wave being received by the AM radio coincides with a frequency of a harmonic component of a horizontal synchronous frequency of the display device, the transparent electrodes are preferably set into a low impedance state by the low impedance setting unit. This may prevent noise emitted from the display device from being mixed into an AM broadcast being received.

DETAILED DESCRIPTION

Figure 1:
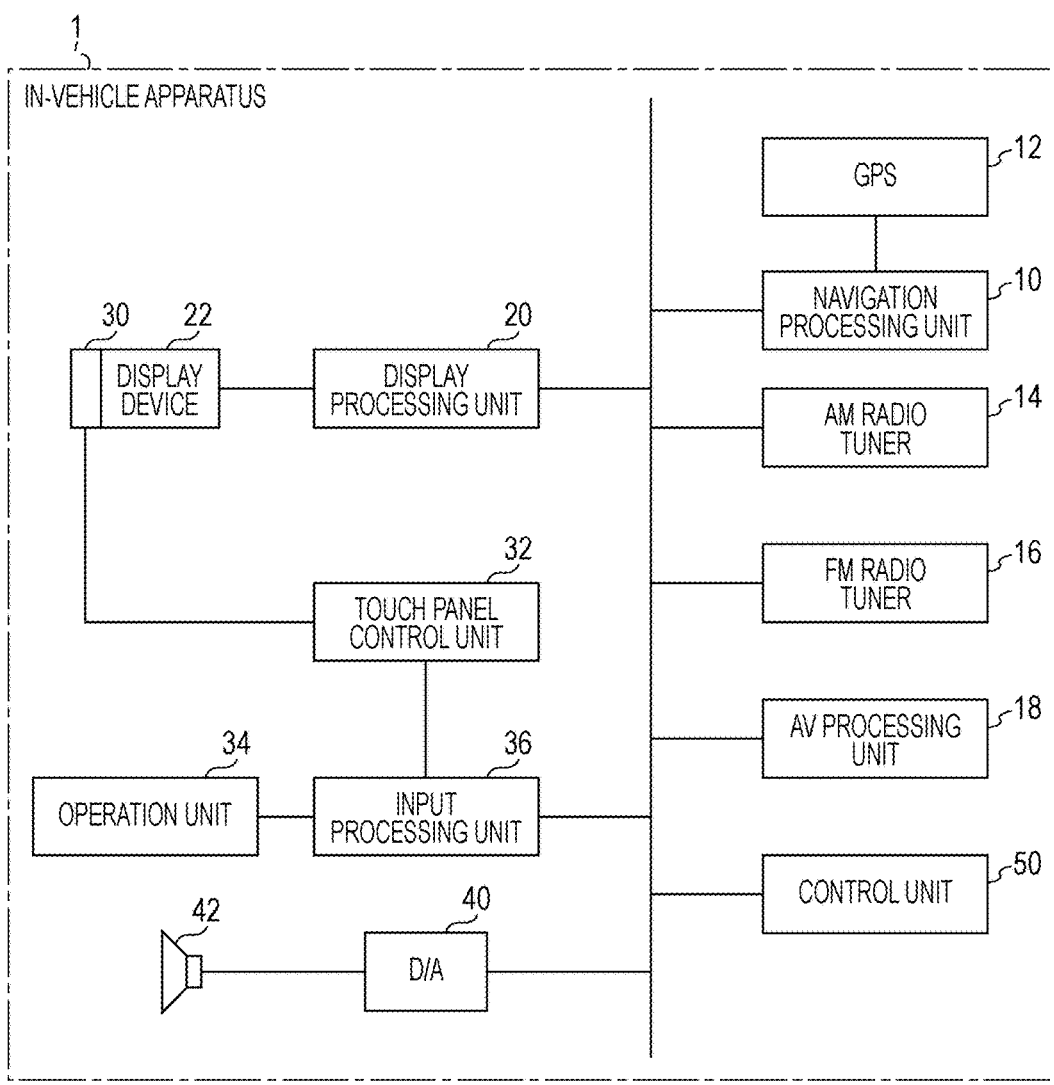
FIG. 1 illustrates the configuration of an in-vehicle apparatus according to an embodiment.

An in-vehicle apparatus according to an embodiment of the present disclosure in which a display device is equipped with a touch panel will be described below with reference to the drawings. FIG. 1 illustrates the configuration of the in-vehicle apparatus according to the embodiment. As illustrated in FIG. 1, an in-vehicle apparatus 1 includes a navigation processing unit 10, an amplitude modulation (AM) radio tuner 14, a frequency modulation (FM) radio tuner 16, an audio-visual (AV) processing unit 18, a display processing unit 20, a display device 22, a touch panel 30, a touch panel control unit 32, an operation unit 34, an input processing unit 36, a digital-to-analog converter (D/A) 40, a speaker 42, and a control unit 50.

The navigation processing unit 10 is used together with a global positioning system (GPS) device 12 that detects the location of the vehicle in which the in-vehicle apparatus 1 is mounted, and performs, by using map data, a navigation operation to guide the vehicle. The AM radio tuner 14 performs a process of receiving an AM broadcast and playing audio corresponding to the content of the broadcast. The FM radio tuner 16 performs a process of receiving an FM broadcast and playing audio corresponding to the content of the broadcast. The AV processing unit 18 performs a process of reading music data or video data which is compressed and stored in a hard disk device (not illustrated) or the like and playing it.

The display processing unit 20 outputs video signals for displaying various operation screens, input screens, or the like, so as to display these screens on the display device 22, and also outputs a video signal for displaying, for example, a screen of video played by the AV processing unit 18 so as to display this screen on the display device 22. The display device 22 is disposed in front of and midway between a driver seat and a front passenger seat, and is constituted by an LCD. For example, the LCD is nine inches in size, the number of pixels (resolution) thereof is 768×1024, and the horizontal synchronous frequency thereof is set to 62 kHz.

The touch panel 30 is disposed on a surface of a display screen of the display device 22. The touch panel control unit 32 performs control required to perform location detection by using the touch panel 30. A location detection device that performs location detection by using a capacitive method is constituted by the touch panel 30 and the touch panel control unit 32. At a point in time when each operation screen or input screen is displayed on the display device 22, when part of the operation screen or input screen is touched by a user with a finger or the like, a display item of the operation screen or input screen may be selected. In order to enable use of such an operation screen or input screen, the touch panel 30 detects a location of a finger or the like when the screen is touched. The touch panel control unit 32 will be described in detail later.

The operation unit 34 accepts an operation performed by the user of the in-vehicle apparatus 1, and includes various operation keys, operation switches, operation knobs, and the like that are arranged around the display device 22. The input processing unit 36 monitors the operation unit 34 and decides on the details of the operation.

The digital-to-analog converter 40 converts audio data or music data generated through each of the processes performed by the navigation processing unit 10, the AM radio tuner 14, the FM radio tuner 16, and the AV processing unit 18 into an analog audio signal, and outputs it from the speaker 42. An amplifier that amplifies a signal is connected between the digital-to-analog converter 40 and the speaker 42. The illustration of the amplifier is omitted in FIG. 1. The same number of combinations of the digital-to-analog converter 40 and the speaker 42 as the number of playback channels are provided; however, only one combination is illustrated in FIG. 1. The control unit 50 controls the entire in-vehicle apparatus 1, and is implemented by causing a central processing unit (CPU) to execute a certain program stored in a read only memory (ROM), a random access memory (RAM), or the like. The above-described components of the in-vehicle apparatus 1 except the speaker 42 are contained in the same housing.

Figure 2:
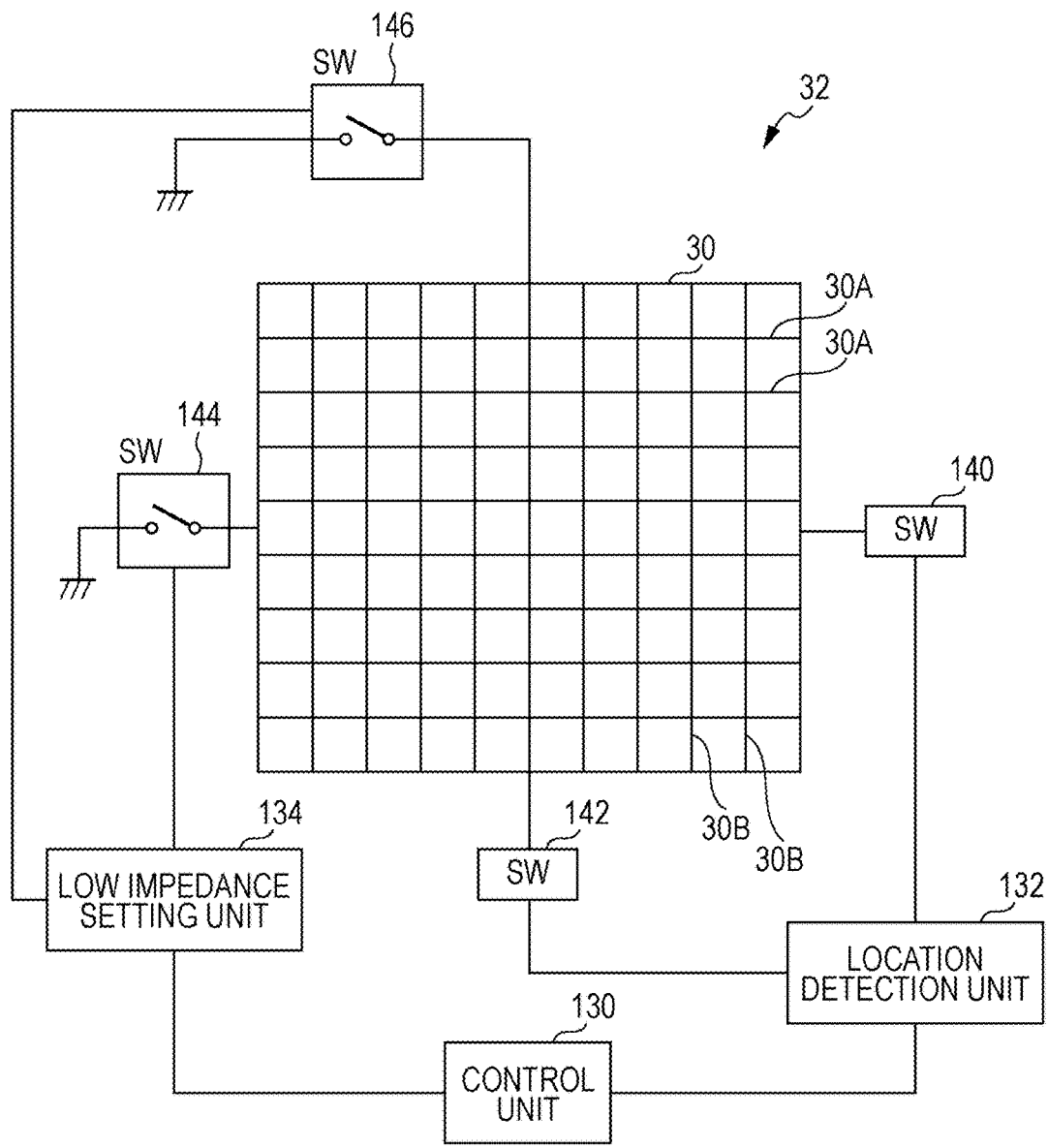
FIG. 2 illustrates the configuration of a location detection device constituted by a touch panel and a touch panel control unit.

FIG. 2 illustrates the configuration of the location detection device constituted by the touch panel 30 and the touch panel control unit 32. The touch panel 30 includes a detection area that covers the entire display screen of the display device 22, and includes, in the detection area, a plurality of first transparent electrodes 30A extending along an X-axis direction (horizontal direction), and a plurality of second transparent electrodes 30B extending along a Y-axis direction (vertical direction).

Figure 3:
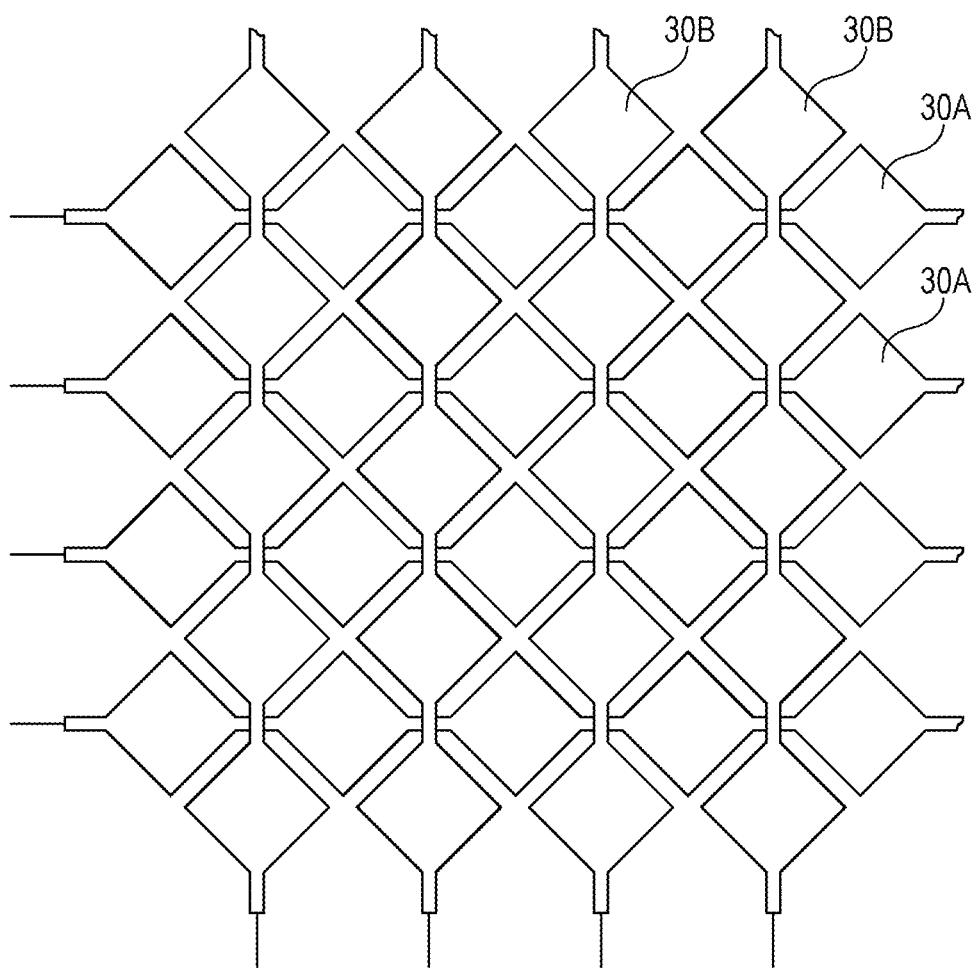
FIG. 3 illustrates a specific example of first and second transparent electrodes included in the touch panel.

FIG. 3 illustrates a specific example of the first and second transparent electrodes 30A and 30B included in the touch panel 30. In the example illustrated in FIG. 3, the first transparent electrodes 30A extending in the X-axis direction each have a configuration in which a plurality of square electrodes arranged so that one diagonal of each square electrode is parallel to an X-axis are connected to each other along the X-axis. Similarly, the second transparent electrodes 30B extending in the Y-axis direction each have a configuration in which a plurality of square electrodes arranged so that one diagonal of each square electrode is parallel to a Y-axis are connected to each other along the Y-axis. As illustrated in FIG. 3, connecting portions that connect each adjacent square electrode are arranged so as to intersect each other, and the entire display screen is thereby covered with the square electrodes of the first and second transparent electrodes 30A and 30B. These first and second transparent electrodes 30A and 30B are composed of for example, an indium tin oxide (ITO) film. In the second transparent electrodes 30B, only connecting portions that connect each adjacent square electrodes are composed of a metallic material, and all of the first and second transparent electrodes 30A and 30B other than these connecting portions may thereby be composed of one layer of ITO film.

Figure 4:
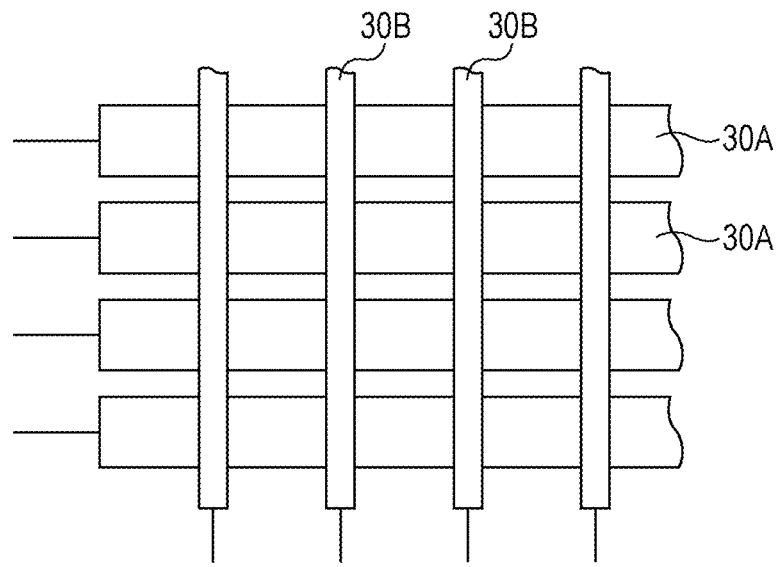
FIG. 4 illustrates another specific example of the first and second transparent electrodes included in the touch panel.

FIG. 4 illustrates another specific example of the first and second transparent electrodes 30A and 30B included in the touch panel 30. In the example illustrated in FIG. 4, the first transparent electrodes 30A extending in the X-axis direction each have a rectangular shape with a wide width. The second transparent electrodes 30B extending in the Y-axis direction each have a rectangular shape with a narrow width. As illustrated in FIG. 4, the first transparent electrodes 30A having a rectangular shape with a wide width are arranged in the X-axis direction, and the entire display screen is thereby covered with the first transparent electrodes 30A. These first and second transparent electrodes 30A and 30B are composed of for example, an ITO film.

In FIG. 2, the touch panel control unit 32 includes a control unit 130, a location detection unit 132, a low impedance setting unit 134, and switches 140, 142, 144, and 146. The control unit 130 controls the entire touch panel control unit 32.

The location detection unit 132 measures changes in capacitance between the first transparent electrodes 30A and the second transparent electrodes 30B that are provided in the touch panel 30, and thereby detects a location touched by an instruction body, such as the user's finger. For example, the location detection unit 132 selects a first transparent electrode 30A via the switch 140, and inputs a certain location detection signal to the selected first transparent electrode 30A, and also performs switching of the switch 142, selects the second transparent electrodes 30B sequentially, and detects the voltages of the transparent electrodes 30B (signals corresponding to the location detection signal) sequentially. This operation is repeatedly performed for all the first transparent electrodes 30A by performing switching of the switch 140. Changes in capacitance between the first and second transparent electrodes 30A and 30B are thereby measured, and thus a location at which first and second transparent electrodes 30A and 30B between which a change in capacitance has occurred intersect each other is identified as the location touched by the instruction body.

The low impedance setting unit 134 sends an instruction to the switch 144 so as to ground remaining first transparent electrodes 30A which have not been selected via the switch 140, and also sends an instruction to the switch 146 so as to ground remaining second transparent electrodes 30B which have not been selected via the switch 142. In this way, the first and second transparent electrodes 30A and 30B in which input/output of a signal (voltage detection) has not been performed are grounded, and these transparent electrodes may thereby be put into a low impedance state. The first and second transparent electrodes 30A and 30B may be connected to a fixed potential other than a ground potential, for example, a high-potential terminal of a power supply, instead of being grounded.

Figure 5:
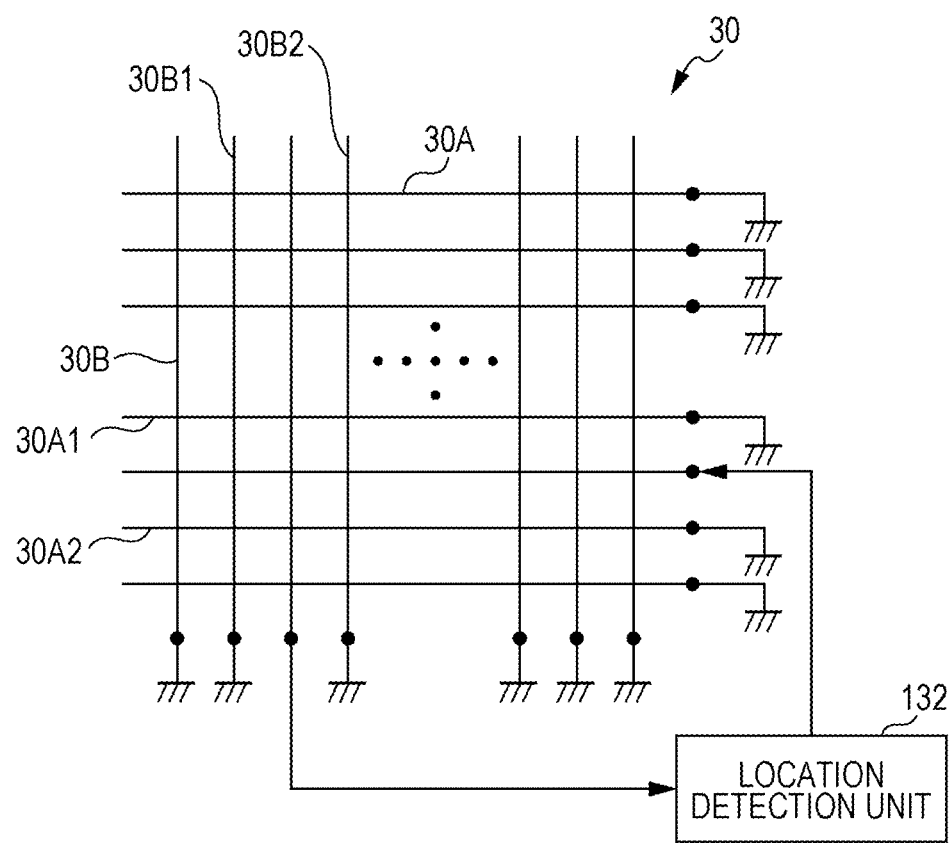
FIG. 5 illustrates a connection state in the touch panel in which a low impedance state of the transparent electrodes is implemented.
Figure 6:
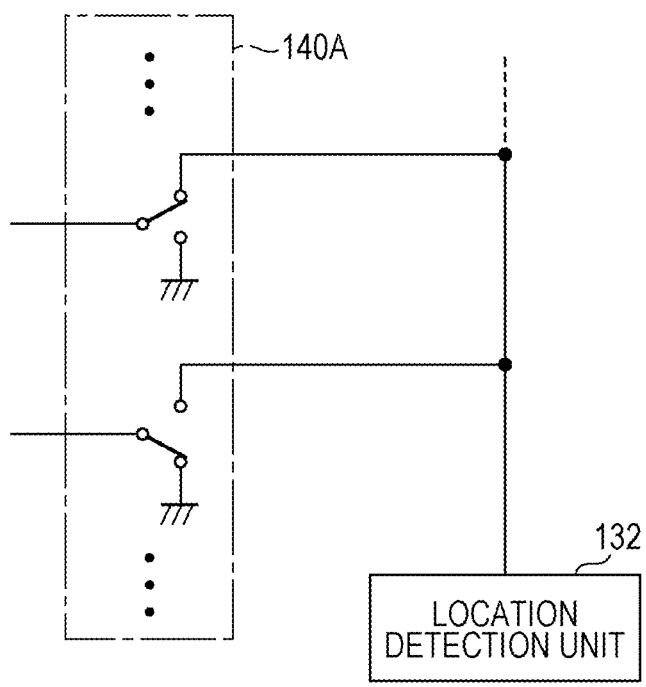
FIG. 6 illustrates a modification of a connection state via switches.

FIG. 5 illustrates a connection state in the touch panel 30 in which a low impedance state of the transparent electrodes is implemented. As illustrated in FIG. 5, in the plurality of first transparent electrodes 30A extending in the X-axis direction, only one first transparent electrode 30A to which a location detection signal is input is connected to the location detection unit 132, and all remaining first transparent electrodes 30A are grounded. In the plurality of second transparent electrodes 30B extending in the Y-axis direction, only one second transparent electrode 30B on which voltage detection is performed is connected to the location detection unit 132, and all remaining second transparent electrodes 30B are grounded. In the configuration illustrated in FIG. 2, the switch 144 is provided in addition to the switch 140; alternatively, these switches may be implemented by one switch 140A as illustrated in FIG. 6. The same applies to the switches 142 and 146.

In this way, in the location detection device according to the embodiment (the touch panel 30 and the touch panel control unit 32), when parts of the transparent electrodes (a first transparent electrode 30A and a second transparent electrode 30B) are selected for location detection, remaining transparent electrodes are put into a low impedance state, thereby enabling noise emitted from the surface of the display device 22 to be blocked. Furthermore, when transparent electrodes are used for location detection, an additional shield layer does not have to be added, and a process for adding the shield layer does not have to be considered. Thus, reductions in transparency and increased costs due to complicated processes may be suppressed. In particular, since most electrodes other than a first transparent electrode 30A and a second transparent electrode 130B that are used for location detection are in a low impedance state, the effect of blocking noise emitted from the surface of the display device 22 may be enhanced.

The first and second transparent electrodes 30A and 30B are put into a low impedance state by connecting these transparent electrodes 30A and 30B to a ground potential (or a fixed potential). A shield layer is thereby implemented by using the transparent electrodes 30A and 30B, and thus leakage of noise emitted from the surface of the display device 22 to the outside may be reduced.

Switching between connection to the location detection unit 132 and connection to a ground potential (fixed potential) via the switches 140 to 146 is performed, and thus simple addition of the switches 144 and 146, which are parts of the switches, enables certain transparent electrodes to be put into a low impedance state at a certain point in time. In the case where the configuration of the switches 140 and 142 previously provided for input/output of a signal is partially changed so as to have functions of the switches 144 and 146, the switches 144 and 146 do not have to be added.

The location detection device according to the embodiment is mounted in the vehicle together with an AM radio (AM radio tuner 14), and also may be mounted in the same housing in which the AM radio is mounted. A frequency of a harmonic component higher than the tenth-order harmonic component of a horizontal synchronous frequency of 62 kHz of the display device 22 overlaps a frequency of an AM radio broadcast. For this reason, noise emitted from the surface of the display device 22 may cause noise generated when an AM radio broadcast is received. Regarding this, in the embodiment, noise emitted from the surface of the display device 22 is reduced by using the touch panel 30 as a shield layer, and thus the effect of noise may be reduced when an AM radio broadcast is received by the AM radio.

The present invention is not limited to the above embodiment, and various modifications may be made within the scope of the gist of the present invention. For example, in the above embodiment, all transparent electrodes other than first and second transparent electrodes 30A and 30B in which input of a location detection signal or output of a signal corresponding to the location detection signal is performed are grounded; however, transparent electrodes adjacent to the first and second transparent electrodes 30A and 30B in which input of a location detection signal or output of a signal corresponding to the location detection signal is performed may not be connected to a ground potential (or a fixed potential), but instead may be opened. For example, in an example illustrated in FIG. 5, first transparent electrodes 30A1 and 30A2, and second transparent electrodes 30B1 and 30B2 are not grounded, but are instead put into an open state. This enables a reduction in noise emitted from the display device 22 while maintaining the sensitivity of location detection.

In the above embodiment, noise of the display device 22 is reduced by using the touch panel 30 as a shield layer regardless of an operating state of the AM radio, or alternatively, may be reduced in relation to an operating state of the AM radio. For example, only while an AM radio broadcast is being received, an operation performed by the low impedance setting unit 134 (FIG. 2) may be enabled. Alternatively, only while an AM radio broadcast is being received and when a reception frequency of this AM radio broadcast coincides with a frequency of noise emitted from the display device 22 (a frequency of a harmonic component of a 62 kHz horizontal synchronous frequency), an operation performed by the low impedance setting unit 134 (FIG. 2) may be enabled. This may prevent noise emitted from the display device 22 from being mixed into an AM broadcast being received.

As described above, when parts of transparent electrodes are selected for location detection, remaining transparent electrodes are put into a low impedance state, thereby enabling noise emitted from a surface of a display device to be blocked. Furthermore, when transparent electrodes are used for location detection, an additional shield layer does not have to be added, and a process for adding the shield layer does not have to be considered. Thus, reductions in transparency and increased costs due to complicated processes may be suppressed.

While there has been illustrated an described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teaching of the invention without departing from the central scope thereof. Therefore, it is intended that this invention not be limited to the particular embodiments disclosed, but that the invention will include all embodiments falling within the scope of the appended claims.

What is claimed is:

1. A location detection device in which a capacitive touch panel is disposed on a surface of a display screen of a display device, the location detection device comprising:
   the touch panel that includes a plurality of transparent electrodes arranged in mutually intersecting directions,
   a location detection unit that detects a touch location of an instruction body by selecting parts of the plurality of transparent electrodes and measuring a change in capacitance between the parts,
   wherein the location detection unit at a point in time inputs a location detection signal to a first part of the electrodes and also captures a signal corresponding to the location detection signal output from a second part of the electrodes,
   a low impedance setting unit that puts transparent electrodes other than the first part, a third part adjacent to the first part, the second part, and a fourth part adjacent to the second part of the plurality of transparent electrodes into a low impedance state by connecting them to a fixed potential,
   wherein the third part and the fourth part of the plurality of transparent electrodes are opened,
   wherein a first set of switches, and a second set of switches are individually connected to each of the plurality of transparent electrodes, and
   wherein switching between input of the location detection signal or output of the signal corresponding to the location detection signal is performed via the first set of switches, and connection to the low impedance state is performed via the second set of switches.

2. The location detection device according to claim 1,
   wherein the plurality of transparent electrodes include a plurality of first electrodes arranged along a first direction, and a plurality of second electrodes arranged along a second direction intersecting the first direction.

3. The location detection device according to claim 2,
   wherein the low impedance setting unit puts the transparent electrodes into a low impedance state by connecting the transparent electrodes other than the first, second, third, and fourth parts to a fixed potential.

4. The location detection device according to claim 3,
   wherein the fixed potential is a ground potential.

5. A method of performing location detection in a location detection device in which a capacitive touch panel is disposed on a surface of a display screen of a display device, the touch panel comprising a plurality of transparent electrodes arranged in mutually intersecting directions, the method comprising:
   detecting, by a location detection unit, a touch location of an instruction body by selecting parts of the plurality of transparent electrodes and measuring a change in capacitance between the parts,
   wherein the location detection unit inputs a location detection signal to a first part of the first electrodes and also captures a signal corresponding to the location detection signal output from a second part of the second electrodes, and
   putting, by a low impedance setting unit, transparent electrodes other than the first part and a third part adjacent to the first part of the first electrodes, and the second part and a fourth part adjacent to the second part of the second electrodes into a low impedance state at a point in time when the location detection unit selects the parts of the transparent electrodes,
   wherein a first set of switches, and a second set of switches are individually connected to each of the plurality of transparent electrodes, and
   wherein switching between input of the location detection signal or output of the signal corresponding to the location detection signal is performed via the first set of switches, and connection to the low impedance state is performed via the second set of switches.

6. The method according to claim 5,
   wherein the plurality of transparent electrodes include a plurality of first electrodes arranged along a first direction, and a plurality of second electrodes arranged along a second direction intersecting the first direction.

7. The method according to claim 5,
   wherein the low impedance setting unit puts the transparent electrodes into a low impedance state by connecting the transparent electrodes other than the first, second, third, and fourth parts to a fixed potential.

8. The method according to claim 7,
   wherein the fixed potential is a ground potential.

9. A location detection device in which a capacitive touch panel is disposed on a surface of a display screen of a display device, the location detection device comprising:
   the touch panel that includes a plurality of transparent electrodes arranged in mutually intersecting directions,
   a location detection unit that detects a touch location of an instruction body by selecting parts of the plurality of transparent electrodes and measuring a change in capacitance between the parts, wherein the location detection unit inputs a location detection signal to part of the electrodes and also captures a signal corresponding to the location detection signal output from part of the electrodes, a low impedance setting unit capable of, at a point in time when the location detection unit selects the parts of the transparent electrodes, putting remaining transparent electrodes into a low impedance state, wherein a first set of switches, and a second set of switches are individually connected to each of the plurality of transparent electrodes, wherein switching between input of the location detection signal or output of the signal corresponding to the location detection signal is performed via the first set of switches, and connection to the low impedance state is performed via the second set of switches, wherein the location detection device is mounted in a vehicle together with an AM radio, wherein the location detection device is mounted in a same housing in which the AM radio is mounted, and wherein the low impedance setting unit sets the remaining transparent electrodes into the low impedance state only when:
- a broadcast wave is being received by the AM radio,
- a reception frequency of a broadcast wave being received by the AM radio coincides with a frequency of noise emitted from the display device, or
- a reception frequency of a broadcast wave being received by the AM radio coincides with a frequency of a harmonic component of a horizontal synchronous frequency of the display device.

* * * * *